United States Patent

Schneider et al.

[11] Patent Number: 5,685,149
[45] Date of Patent: Nov. 11, 1997

[54] PROPORTIONALLY CONTROLLED THERMOCHEMICAL MECHANICAL ACTUATOR

[75] Inventors: Edward T. Schneider, Eastlake; Kenneth A. Javor, Concord, both of Ohio

[73] Assignee: TCAM Technologies, Inc., Eastlake, Ohio

[21] Appl. No.: 557,278

[22] Filed: Nov. 14, 1995

[51] Int. Cl.$^6$ ........................................ F03G 7/06
[52] U.S. Cl. ........................ 60/528; 60/527; 250/573
[58] Field of Search ...................... 60/527, 528, 524; 318/600, 602, 626, 432, 434, 445, 466, 452, 461, 468; 361/27, 25; 219/513, 496, 497; 227/11, 14, 22, 24, 25; 250/573; 425/140, 141, 144, 149, 169, 170, 171

[56] References Cited

U.S. PATENT DOCUMENTS

| | | | |
|---|---|---|---|
| 2,938,384 | 5/1960 | Soreng et al. | 73/358 |
| 2,989,281 | 6/1961 | Fritts | 251/11 |
| 4,081,963 | 4/1978 | Stove | 60/528 |
| 4,258,899 | 3/1981 | Huelle et al. | 251/11 |
| 4,553,393 | 11/1985 | Ruoff | 60/528 |
| 4,685,651 | 8/1987 | Nouvelle et al. | 251/11 |
| 5,025,627 | 6/1991 | Schneider | 60/527 |
| 5,177,969 | 1/1993 | Schneider | 60/527 |
| 5,288,214 | 2/1994 | Fukuda et al. | 417/395 |
| 5,419,133 | 5/1995 | Schneider | 60/527 |

FOREIGN PATENT DOCUMENTS

| | | | |
|---|---|---|---|
| 701621 | 1/1965 | Canada | 236/5 |
| 0 365011 A2 | 4/1990 | European Pat. Off. | |

OTHER PUBLICATIONS

"High–Output Paraffin Linear Motors: Utilization in Adaptive Systems", Tibbitts, SPIE V. 1543 Active & Adaptive Optical Components (1991) pp.388–398.

"Electrothermal Microactuators Based On Dielectric Loss Heating", Rashidian, et al., Proc. IEEE Micro Electro Mech Sys–An Invest of Micro Structures, Sensors, Actuators, Mach & Sys; Ft. Lauderdale, FL Feb. 7–10 '93 pp. 24–29.

Technical Specification No. Cod.82.0331.00 (Italy) May 7, 1991.

PTC Thermistors, Introduction to PTC Overload Protection, Philips Components, Mar. 31, 1995 pp. 225–228.

Primary Examiner—Ira S. Lazarus
Assistant Examiner—Nhat-Hang H. Lam
Attorney, Agent, or Firm—Fay, Sharpe, Beall, Fagan, Minnich & McKee

[57] ABSTRACT

An operator selects an operating characteristic, such as a degree of extension or force of an extension member (66) of a thermal actuator (16), with an input circuit (10). The input control circuit generates a reference signal. A feedback circuit (18) monitors a characteristic of the thermal actuator such as a temperature of its internal polymer, extension of the extension member, force, or the like, and generates a corresponding feedback signal. An error circuit (12) compares the reference and feedback signals and generates an error signal in accordance therewith. A dither circuit (30) generates an oscillating dither signal that is superimposed on one of the control and feedback signals before comparison by the error circuit. A power conversion circuit (14) adjusts an amount of electrical power supplied to a heating element (54) of the thermal actuator in accordance with the error signal.

31 Claims, 5 Drawing Sheets

PROPORTIONALLY CONTROLLED THERMOCHEMICAL MECHANICAL ACTUATOR

BACKGROUND OF THE INVENTION

The present invention relates to mechanical power supplies and actuators. It finds particular application in conjunction with high force, low travel extensible actuators and will be described with particular reference thereto. However, it is to be appreciated that the invention will also find application in conjunction with other high pressure fluid systems, as well as other mechanical power supplies, pumps, motors, pressure cylinders, valve controllers, and the like.

One way to effect heat transfer is by physically moving mass, e.g., moving a liquid to a heat source. Heated liquid/vapor is caused to flow against resistance to a cooling source. Steam and other types of external combustion engines typify this technique. In another technique, heat energy locked in molecular bonding is pumped into a combustion chamber. The mix is ignited and the combustion vapor is permitted to exit the chamber against resistance, physically removing the heat and clearing the chamber for the next cycle. The internal combustion engine typifies this mode. These two modes utilize the well-known capabilities of mass transfer as an efficient method of transporting heat and minimizing the need for thermal conduction for moving the heat.

These liquid/vapor phase techniques have several drawbacks. First, the vapor phase is compressed at very high pressures. An unanticipated release of these pressures creates shock waves associated with a blast, hurling debris in a dangerous manner. The material is transported and expended, requiring complex controls and valving, as well as a continuous supply of liquid to replace the liquid lost or consumed.

Rather than transporting the material which is acted upon by the heat to expand and contract, the heat itself may be moved. More specifically, as shown in U.S. Pat. Nos. 5,177,969 and 5,025,627, heat can be conducted into and out of a sealed chamber which expands during the heating cycle and contracts during the cooling cycle. The sealed chamber technique has many advantages including its mechanical simplicity, high stiffness actuation, ready adaption to a variety of heat sources, high power density, and silent operation. Moreover, because liquids compress only a small amount, as compared to vapors, they tend to be much safer than a liquid/vapor system. Unfortunately, the transfer of heat into and out of the medium normally relies on thermal conductivity. Mediums which exhibit good expansion/contraction ratios upon melting tend to have relatively poor thermal conductivities. Thus, a solid/liquid sealed chamber phase change actuator tends to have a very slow cycle time.

Through the use of limit switches, the sealed chamber devices have been controllable to selected throws or degrees of extension. In one embodiment, the actuator is cycled extending until a first limit switch is tripped, stopping actuation power. When the unit retracts and contacts a second limit switch, power is again supplied. By positioning the limit switches close together, a substantially steady-state degree of extension can be held. However, an effective proportional control was lacking.

The present invention contemplates a new and improved proportional control for sealed chamber actuators.

SUMMARY OF THE INVENTION

In accordance with the present invention, an electrically controlled thermal actuator system is provided. An actuator body defines an interior chamber containing a polymeric material that expands when heated. An extension member is connected with the polymeric material to extend relative to the actuator body as a polymeric material is heated. A power supply selectively supplies electrical power to a heating element that is disposed in the interior chamber. An input circuit provides a control signal indicative of a selected degree of extension of the extension member relative to the thermal actuator body. A feedback circuit senses a condition of the thermal actuator and provides a feedback signal indicative of the sensed condition. An error signal determines a deviation between the control signal and the feedback signal and controls the power supply in accordance therewith.

In accordance with a more limited aspect of the present invention, a dither circuit generates an oscillating dither signal. The dither circuit is connected with one of the input circuit, the feedback circuit, and the error circuit for adding the dither signal to one of the control and feedback signals.

In accordance with another aspect of the present invention, the feedback circuit senses at least one of position, speed, or force of the extension member or temperature or quality of the polymeric material.

In accordance with another aspect of the present invention, a method of controlling a thermal actuator is provided. The thermal actuator includes an actuator body defining an interior chamber that contains a polymeric material which expands when heated. An expansion member is connected with the polymeric material to extend relative to the body portion as the polymeric material is heated. A heating element is disposed in the interior chamber. A condition of the thermal actuator is sensed and a corresponding feedback signal is generated. A reference signal indicative of a selected extension, force, or quality characteristic of the extension member is provided. The reference and feedback signals are compared to produce an error signal indicative of a deviation therebetween. An amount of power supplied to the heating element is adjusted in accordance with the error signal.

In accordance with a more limited aspect of the present invention, an oscillating dither component is added to one of the control and feedback signals.

One advantage of the present invention resides in its ability to produce true and accurate proportional control.

Another advantage of the present invention resides in its mechanical simplicity.

Still other advantages of the present invention include high power densities, silent operation, safety, rapid operating speeds, and high stiffness.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
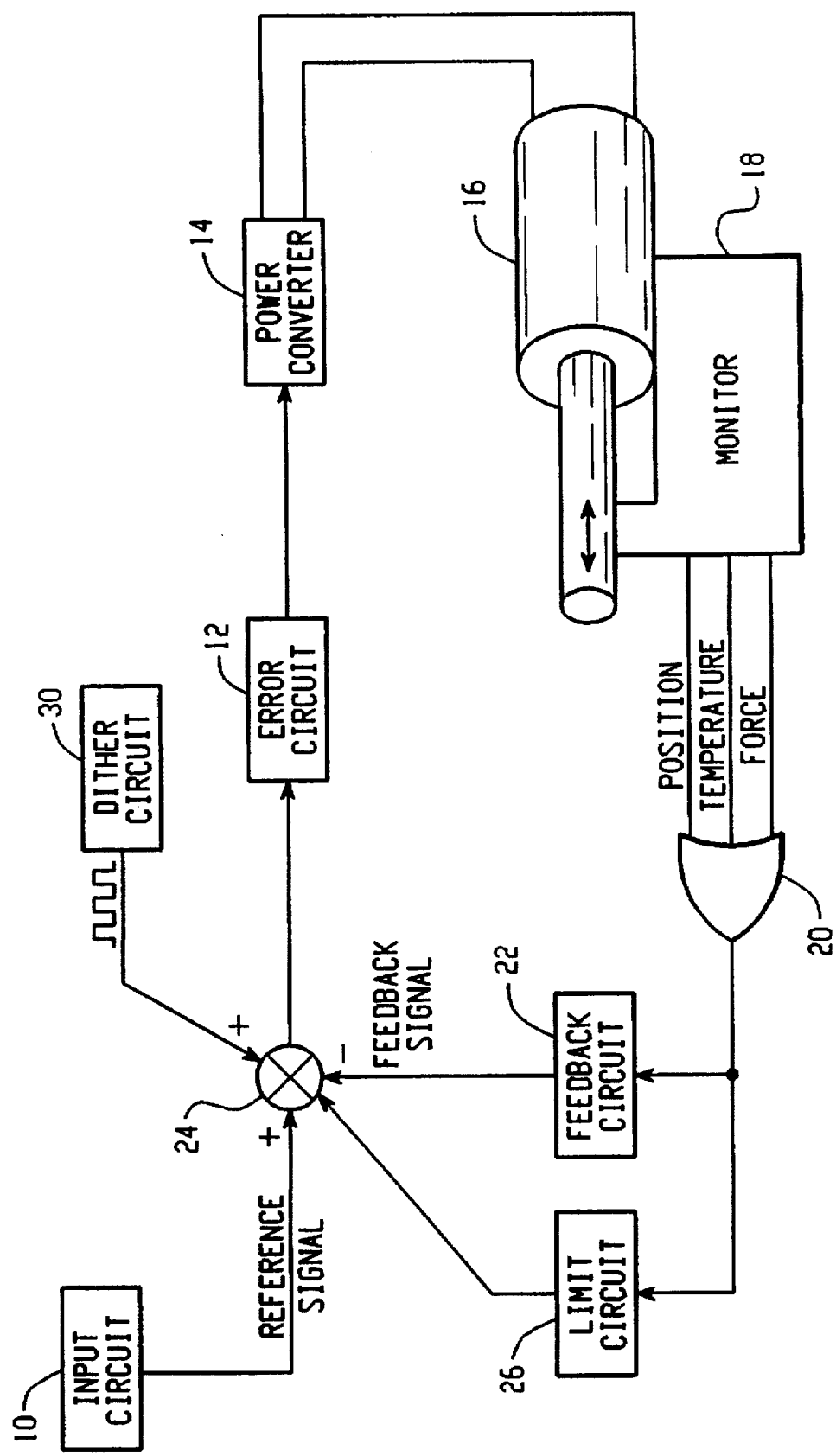
FIG. 1 is a block diagram of a proportional control circuit in accordance with the present invention.

With reference to FIG. 1, an operator or reference input circuit 10 provides an input signal indicative of a desired position, speed, actuation force, temperature of the control device, or the like. An error circuit 12 determines an error between the reference input and a corresponding feedback signal to generate an error signal. Suitable error circuits include differential amplifiers, comparators, and microprocessors. A power conversion device 14 converts the error signal into an appropriate electrical power level for a sealed chamber thermal actuator 16, such as the actuators shown in U.S. Pat. Nos. 5,025,627, 5,177,969, 5,419,133, or pending U.S. patent application Ser. No. 08/447,914. A feedback monitor 18 monitors selected responses of the thermal actuator 16. The monitored response(s) corresponds to the reference input from the reference input circuit Accordingly, the monitored physical conditions include position, change in position or speed, force, temperature, pressure, optical transparency (of the polymer), quality, and the like. When there are more than one feedback monitor which may be selected, an OR circuit 20 combines or passes the selected one as a feedback signal. A feedback signal circuit 22 provides any appropriate adjustment to the magnitude, amplification, or other characteristics of the feedback signal such that its magnitude and other characteristics correspond to the reference input from the input circuit 10. The reference input circuit and the feedback signal are compared by being applied to positive and negative inputs of a differential amplifier, subtracted at a summing junction 24, or the like.

Preferably, a limit control circuit 26 monitors for limit conditions such as a limit extension, maximum or limit temperature, maximum or limit force, or the like. In response to this limit being reached, the limit control circuit provides a signal to the error circuit which causes it to zero or reduce the error signal, hence stops or reduces the amount of power supplied by the power converter 14.

A dither circuit 30 provides an oscillating dither signal which is summed with the reference (or feedback) signal. The dither signal has a frequency which is commensurate with a speed of the thermal actuator. With the thermal actuator of the preferred embodiment that has an actuation time of about 1.5 seconds, a dither frequency of about 10 to 50 hertz is provided, with about 20 hertz being preferred. The dither signal has an amplitude which is a fraction of the reference (or feedback) signal. The dither circuit can be interconnected with the reference input such that the dither amplitude is adjusted in accordance with the amplitude of the reference input, e.g., 10% of the reference signal. Alternately, the dither signal can have an amplitude that is a fixed fraction.

Figure 2:
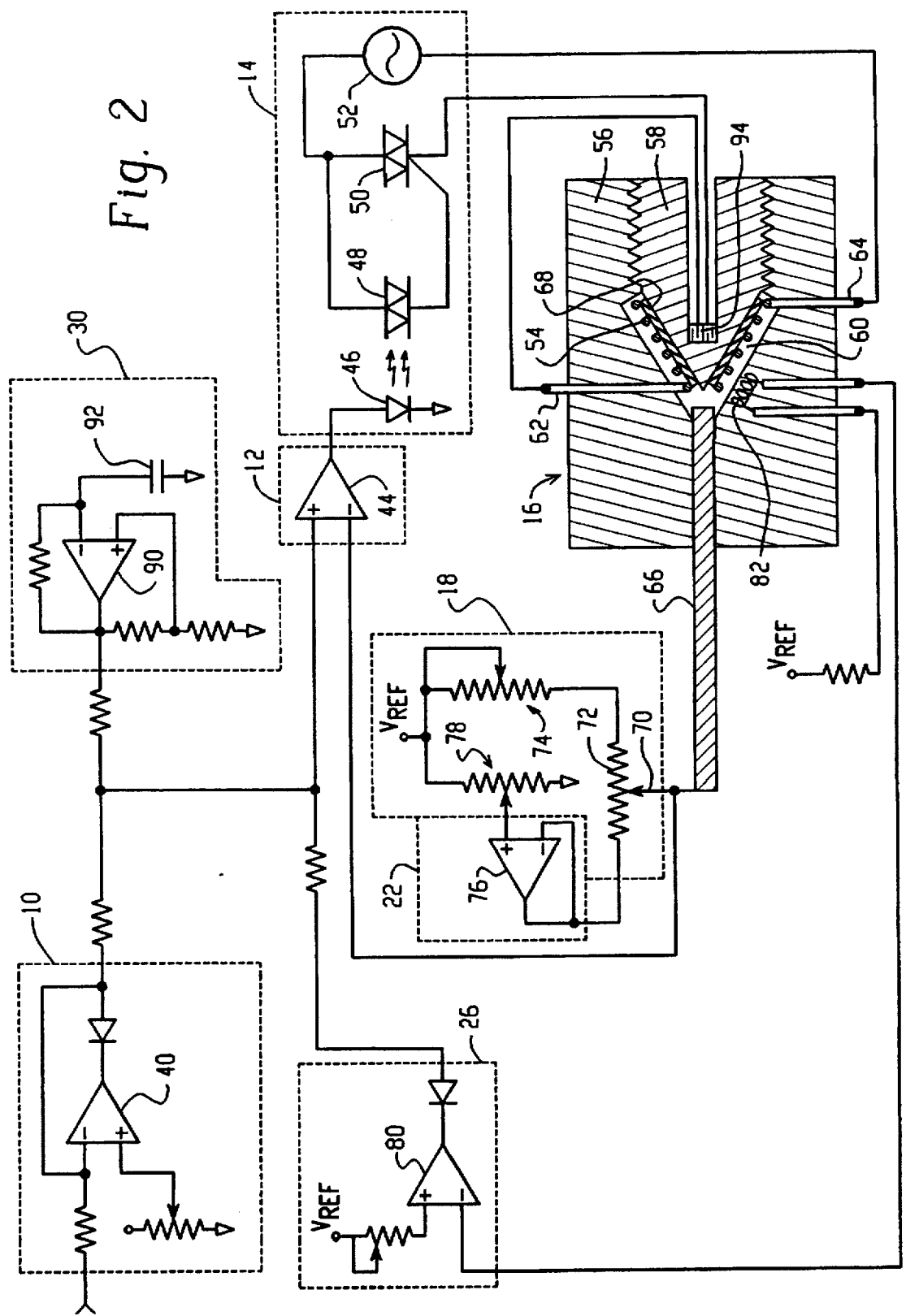
FIG. 2 is a detailed circuit of a preferred embodiment of the feedback control circuit of FIG. 1.

With reference to FIG. 2, the input circuit 10 in the preferred embodiment compares a variable DC voltage source to a fixed value. It includes an operational amplifier 40 configured as a comparator to limit the input to the fixed value.

The error signal circuit 12 includes a differential amplifier 44 that receives the control signal in one of its positive and negative inputs, the positive input in the preferred embodiment.

In the preferred embodiment, the power converter includes a light emitting diode or other optical source 46 coupled with a light sensitive triac 48 or the like to provide electric isolation between the error signal and the thermal actuator 16. Of course, magnetic, radio frequency, and other interconnections which do not provide a direct electrical connection may also be utilized. Analogously, direct electrical connections can be utilized and may be advantageous for circuit simplicity and efficiency. The light sensitive device 48 is connected with a triac 50 which controls the percentage of each oscillation of an AC power source 52 which is supplied to a heating coil 54 of the thermal actuator 16. For DC power sources, a MOSFET transistor, or the like, replaces the triac 50.

The thermal actuator includes first and second body portions 56, 58 which define an interior chamber 60. In the preferred embodiment, the body portions 56 and 58 have conical, cylindrical, or other geometry surfaces which are parallel and closely adjacent to each other such that the interior chamber 60 is a thin, disk, conical or tubular region. The heating element 54 is wound in a helical pattern through the conical sealed chamber 60, extending between high pressure electrical feedthroughs 62, 64. An extensible member 66 such as a pin, snap dome, bellows, or the like is connected with the sealed chamber 60. The chamber is filled with polymer which expands as it is heated, extending the extensible element 66 and contracts as it cools, allowing the extensible element to be retracted. In the preferred embodiment, the polymer undergoes a phase change which provides an effective conversion of thermal energy into expansive force.

In the preferred embodiment, the heating element 54 is nichrome wire that is mounted on electrically insulating offset members, such as plastic ribs 68, which holds the nichrome wires in a spaced relationship relative to the body portions 56, 58. For rapid thermal cooling for rapid retraction, the body members are made of a highly thermally conductive material, such as aluminum, which is also electrically conductive. For rapid actuation, it is preferred that the electrical resistance wire are mounted within only a few polymer molecular lengths of each other and the walls of the body members. In the preferred embodiment, the heating wires are spaced within 0.3 cm apart, preferably 0.1 cm apart or less. The heating wires are also spaced a similar dimension from the walls. The polymer is preferably a medium chain polyethylene, such as paraffin. Such medium chain polyethylenes each have a temperature at which they undergo a phase change. A selection is made among the various polyethylenes in accordance with the temperature of the environment in which the thermal actuator is to be operated.

The monitor circuit 18 of the illustrated embodiment monitors extension of the extensible member 66. The extensible member is connected with a slide member 70 of a potentiometer 72. A reference voltage 74 is applied across the variable resistor such that the signal output on the slide 70 is proportional to extension of the extensible member and of a magnitude and range which matches the magnitude and range of the control signal from the input circuit 10. The feedback signal is connected to the negative input of the differential amplifier 44 such that the error signal is the difference between the control or reference signal and the feedback signal. The feedback circuit 22 has an amplifier 76 that provides an adjustable reference voltage for the opposite end of the potentiometer. An adjustable reference voltage 78 provides a zero adjustment for the output of the potentiometer 72. Adjusting the reference voltage 74 at the other end of the potentiometer provides an adjustment for the voltage range or span of the feedback signal. Alternately, a linear transformer, optical sensors, magnetic sensors, and the like can be used to measure extension. Of course, rather than sensing extension of the extensible member 66, a differentiating circuit may be provided to differentiate the position and provide an indication of the speed of extension. As another alternative, a thermocouple can be embedded in the polymeric material in the sealed chamber 60 or very closely thereto to sense temperature of the polymer. As another alternative, a current sensor can be connected with one of the feedthroughs 62 to determine the temperature of the heating element 54 based on the electrical current drawn, resistance across the heating element, or other electrical characteristics.

The limit control 26 provides a limit signal which causes the error circuit to stop the thermal actuator from extending further or otherwise exceeding temperature limits of the actuator. In the illustrated embodiment, the limit control circuit 26 senses temperature of the thermal element or the polymer. A limit signal is provided when preselected temperature limits are exceeded. An amplifier 80 is connected with a thermocouple 82. When the temperature exceeds a preselected limit, the reference or control signal is reduced or even zeroed.

The dither circuit 30 of the preferred embodiment includes an oscillator which provides an oscillating output. With the preferred thermal device that has an actuation speed of about 1.5 seconds, an oscillation frequency of about 20 hertz is preferred. The oscillator of the preferred embodiment includes an amplifier 90 having one input connected with a capacitor 92 and the other input connected in a feedback loop. The feedback loop is interconnected with the input circuit 10 to control the amplitude in accordance with the amplitude of the control signal. In the preferred embodiment, the dither signal is controlled to have an amplitude of about 10% of the input signal. Of course, rather than controlling the amplitude of the dither signal, the width of its pulses can be modulated, or the like. The dither overcomes errors due to pin friction or stick slip.

To reduce the risk of a thermal overload, a positive temperature coefficient (PTC) thermistor device 94 is mounted in thermal communication with the polymer. The PTC device is connected between the power converter 14 and the heating element 54. As the PTC device warms, its electrical resistance increases, reducing the amount of electrical power supplied to the heating element.

The PTC device is amenable to open loop control systems. The open loop control system includes a power supply which supplies power for the heating coil. A power level control, such as a pulse width modulator, adjusts the amount of power delivered to the heating coil. The preferred pulse width modulator has a constant voltage amplitude, but has pulses of variable width to adjust the amount of energy supplied to the heating coil. Of course, other power supplies are contemplated such as adjustable magnitude voltage supplies, and the like. In order to prevent filament burnout, a positive temperature coefficient (PTC) thermistor device is connected between the power supply and the filament. The PTC thermistor is mounted closely adjacent the polymeric material in close thermal communication. Because the positive temperature coefficient device has an electrical resistance that increases with temperature, as the temperature of the polymer approaches a limit temperature, the amount of current passed to the heating element decreases. Eventually a steady-state maximum temperature is reached.

Figure 3:
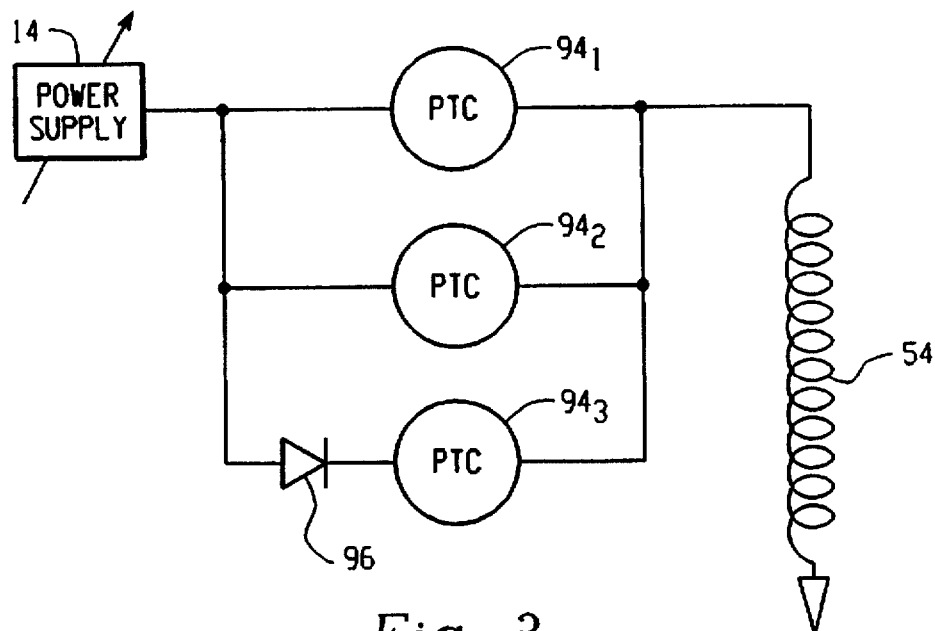
FIG. 3 is an alternate embodiment using multiple positive temperature coefficient devices.

With reference to FIG. 3, a plurality of PTC devices $94_1$, $94_2$, $94_3$, . . . , are positioned around the interior chamber 60.

Each PTC device is selected to have different temperature characteristics. By adjustably selecting the properties of three, for example, PTC devices, the response curve can be adjustably selected. Optionally, a diode 96 is connected in series with one or more of the PTC devices to provide for dead heading. For example, a relatively sharp cut-off can be achieved such that extension is proportional to power to a preselected set point after which added power causes substantially no more heating. Other combinations of PTC devices can be used to make the power to extension curve follow preselected linear or non-linear characteristics.

Figure 4:
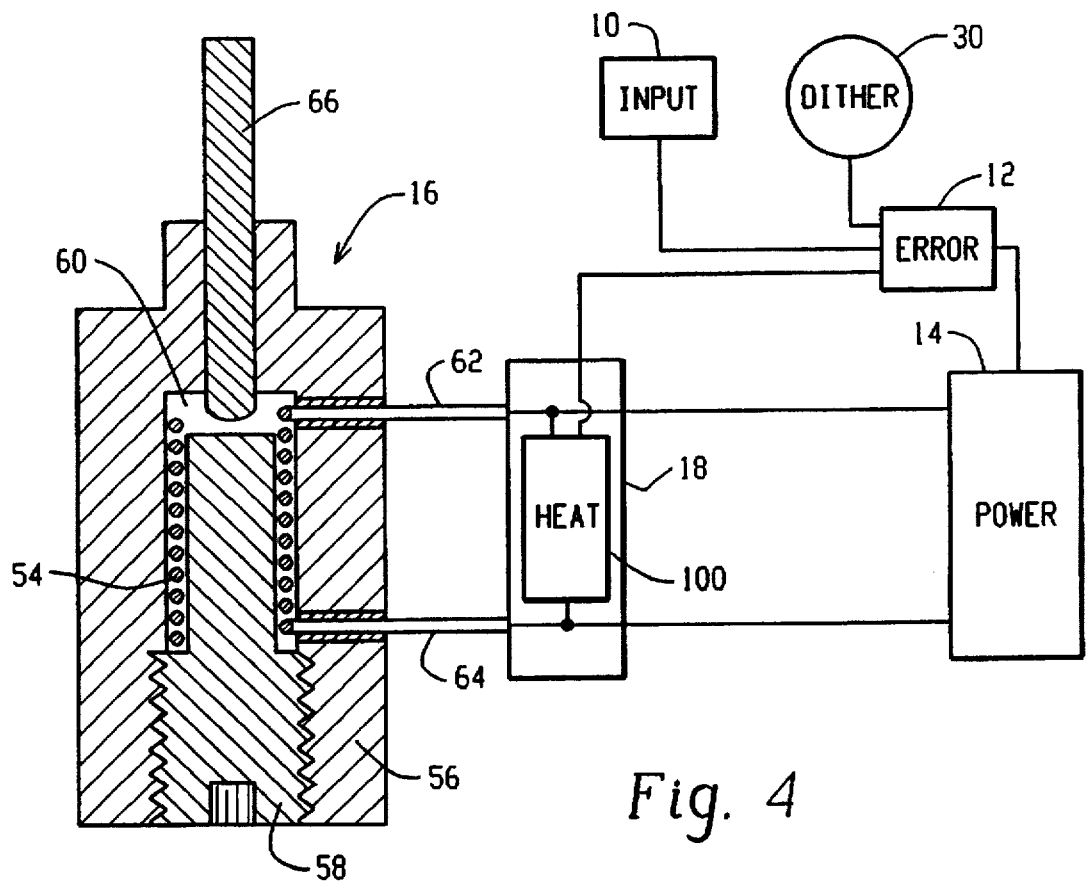
FIG. 4 is a diagrammatic illustration of an alternate embodiment of the present invention.

With reference to FIG. 4, various types of feedback monitors 18 are contemplated. For example, a linear voltage displacement transducer can be utilized to measure the position of the extensible member 66. Load cells may be used to measure force of the extensible element. However, LVDTs and load cells tend to be relatively expensive.

The sealed chamber thermal actuator 16 uses polymers which expand or change volume to create pressure which powers the actuator. The thermal state of the polymer is a thermodynamic property which can typically be described uniquely by temperature, pressure, and specific volume of the material. In the disclosed thermally expansible actuators, the polymer pressure is directly related to the force or load of the actuator; and the specific volume of the polymer is directly related to the extension of the actuator. Except at the melt or phase change point, knowing any two of the temperature, pressure, and specific volume parameters enables the third to be calculated. At the melt or phase change point, i.e., a point of fusion, a discontinuity occurs in which the temperature and pressure parameters are no longer independent. Rather, these two parameters become dependent such that an additional parameter is needed to characterize the system uniquely. For example, at the boiling point of water, temperature and pressure become linked to constant values throughout the vaporization. The specific volume enthalpy and entropy of the material are increased dramatically as the water is converted from liquid to vapor. However, the temperature and pressure remain fixed throughout this process. In steam systems, an additional parameter introduced for describing the thermodynamic state of the material is the quality. The quality of steam is the mass percentage of the mixture which exists as a liquid divided by the total mass of the liquid and vapor system. Hence, a knowledge of quality and pressure of the present actuator can provide sufficient information to calculate force and extension of the actuator. Likewise, quality and temperature, specific volume and temperature, and other combinations of two independent variables can be the basis of calculations to define the unique state of the actuator.

The thermocouple 82 of FIG. 2, rather than being a limit condition sensor, can be utilized to sense the temperature parameter. Although there may be temperature variations across the interior chamber of the actuator, appropriate calibration of the electronic circuitry is sufficient such that the temperature signal can be utilized as the feedback signal.

The quality parameter of the system can be determined by a specific volume measurement of the polymer or by a density measurement. Specific volume, again, is determinable by extension of the extensible member, but may also be determined by integrating the total heat input into the system, or by density measurements, for a system with known enthalpy and entropy states. With reference to FIG. 4, the heat input can be measured and integrated by a circuit 100 connected with the input leads 62, 64, of the actuator 16. For example, the heat input integration can be determined by calculating the total number of heating watts supplied, less the heat flux which flows from the actuator to a heat sink. If the heat flux to the heat sink is constant, the heat calibration of the circuit 100 can remove its effect. If the heat sink temperature varies, then the heat flux will be a function of the sink temperature. By measuring the temperature of the heat sink, a calculation of the heat flux to the sink can be calculated, integrated, and subtracted from the input wattage.

Figure 5:
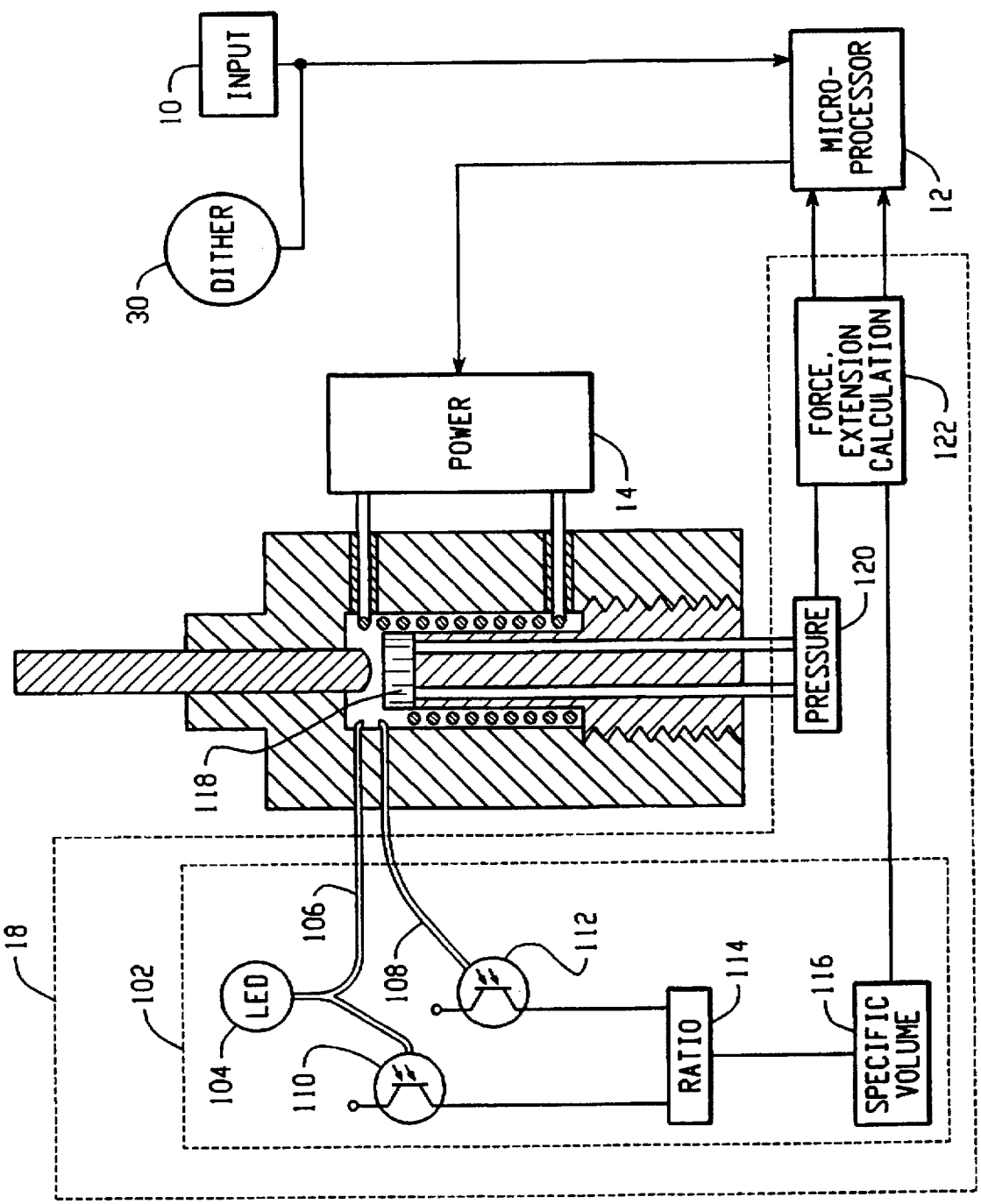
FIG. 5 is a diagrammatic illustration of yet another alternate embodiment of the present invention in which two parameters of the polymer are measured to determine extension and force characteristics.

With reference to FIG. 5, the feedback monitor 18 measures the density of the polymer directly which a circuit 102 converts to an indication of the specific volume. Various techniques can be utilized for measuring the density of the polymer. The embodiment of FIG. 5 uses a property found in many polymers in that they change from a translucent to a clear color as they melt. An LED 104 provides light which is carried by an optical fiber 106 into the polymer in the sealed chamber 60. A second optical fiber 108 has an end spaced from the first optical fiber 106 by a gap which is filled by the polymer. Photodiodes 110 and 112 measure the intensity of light transmitted into the polymer and the amount of light which crossed through the polymer in the gap. A ratio circuit 114 determines a ratio of these intensities provides an indication of the translucency or clarity of the polymer, hence its density and specific volume. A specific volume circuit 116 converts the ratio into a signal indicative of specific volume. The exact details of the specific volume circuit are dependent on the polymer selected. Alternately, an index of refraction type of fiber optic sensor can be used to sense a melt state of the polymer.

A pressure sensor 118 is placed in the sealed chamber 60. Various pressure sensors are contemplated such as an optical fiber pressure sensor, a capacitive pressure sensor, or the like. A pressure output circuit 120 provides a signal that is proportional to pressure. A circuit 122 converts the pressure and specific volume to provide a direct indication of extension and force of the actuator. The error circuit 12, preferably a computer, compares actual extension and force characteristics with the operating characteristics input by the input circuit 10 and controls the power supply 14 accordingly. Preferably, the functions of circuit 122 and 12 are incorporated into a common microprocessor.

Figure 6:
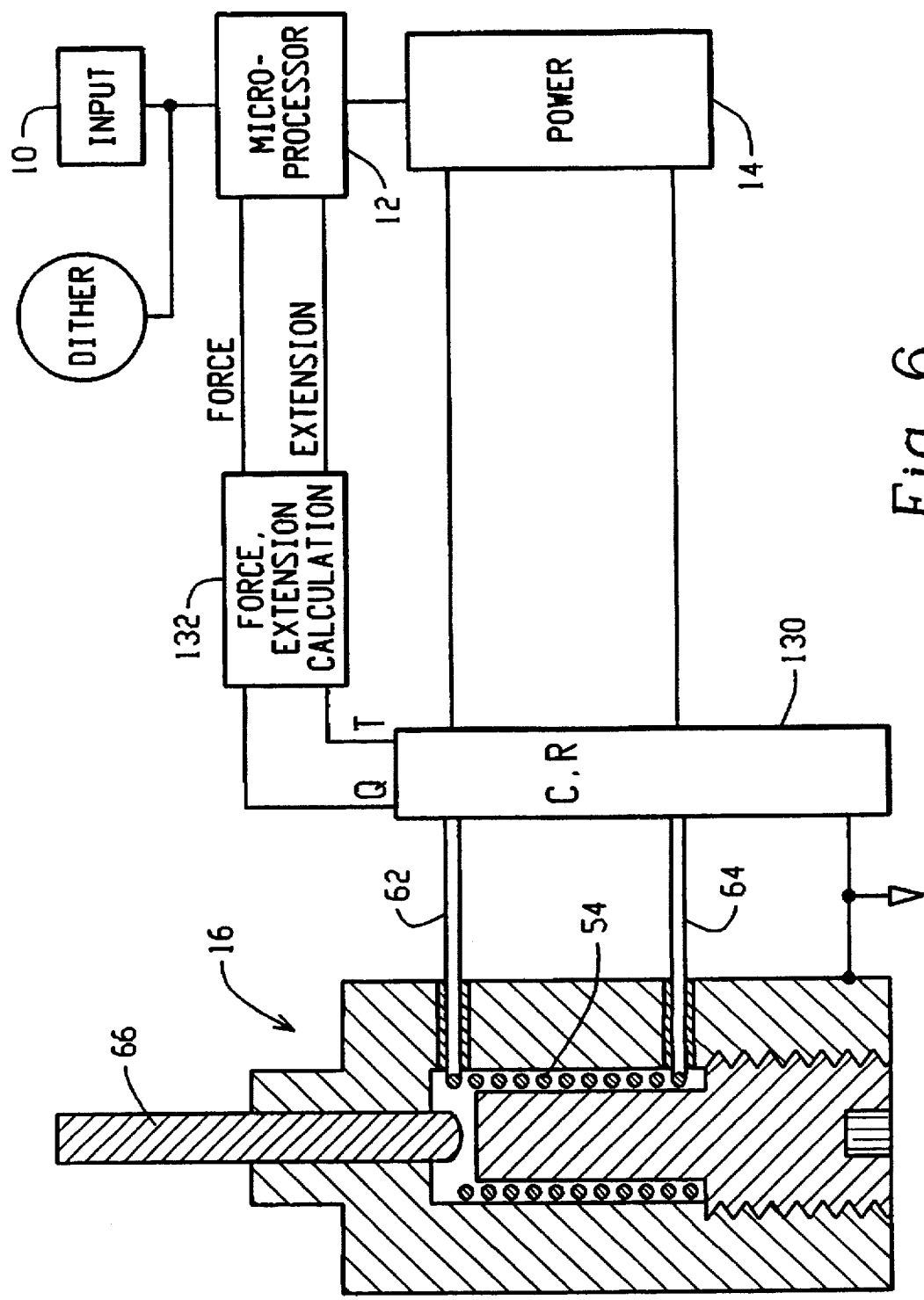
FIG. 6 is a diagrammatic illustration of yet another alternate embodiment of the present invention.

With reference to FIG. 6, the quality of the polymer can also be determined from its electrical properties. The feedback monitor includes a circuit 130 which measures the capacitance or the resistance between the heating coil 54 and the body of the actuator. It is to be appreciated that the heating coil and the body are separated from each other by the dielectric polymer to define a capacitor. As the dielectric properties of the polymer change with temperature, the capacitance of the capacitor changes. Analogously, the polymer is part of a resistive path between the heating coil and the body of the polymer. Changes in density again cause a change in resistance which is again indicative of the quality parameter. Analogously, independent sensors or sensing elements may be positioned in the sealed chamber 60 in contact with the polymer to sense the changes in its dielectric properties electrically. The circuit 130 also reads the resistance across the leads 62, 64 to provide an indication of temperature. From the temperature and quality of the polymer, the force and extension of the extensible member are readily calculated by a circuit 132. The force and extension of the extensible member from circuit 132 is compared with a desired extension or force input by input 10 by a central controller 12, preferably computer-based.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In an electrically controlled thermal actuator system that includes an actuator body defining an interior chamber containing a polymeric material which expands when heated, an extension member connected with the polymeric material to extend relative to the actuator body as the polymeric material is heated, a heating element disposed in the interior chamber, and a power supply for selectively supplying electrical power to the heating element, the improvement comprising:

an input circuit for providing a control signal indicative of a selected degree of one of extension and force of the extension member relative to the thermal actuator body;

a feedback circuit which (1) senses a condition of the thermal actuator and (2) provides a feedback signal indicative of the sensed condition;

a dither circuit for generating an oscillating dither signal, the dither circuit being connected with one of the input circuit and the feedback circuit for adding the dither signal to one of the control signal and the feedback signal;

an error circuit for determining a deviation between the control signal and the feedback signal as modified by addition of the dither signal and controlling the power supply in accordance therewith.

2. In the thermal actuator system as set forth in claim 1, the improvement further comprising:

the dither circuit including an oscillator which oscillates at about 10–50 hertz.

3. In the thermal actuator system as set forth in claim 2, the improvement further comprising:

the oscillator being tuned to oscillate at 20 hertz.

4. In the thermal actuator system as set forth in claim 1, the improvement further comprising:

one of the input and feedback circuits being connected with the dither control circuit to control an amplitude of the dither signal in accordance with an amplitude of at least one of the control signal and the feedback signal.

5. In the thermal actuator system as set forth in claim 1, the improvement comprising:

the feedback circuit including a sensor interconnected with the extension member for providing an electrical signal that varies in accordance with at least one of extension, speed, and force of the extension member.

6. In the thermal actuator system as set forth in claim 1, the improvement further comprising:

a positive temperature coefficient thermistor mounted in thermal communication with the polymeric material and being electrically connected between the power supply and the heating element.

7. In the thermal actuator system as set forth in claim 1, the improvement further comprising:

the feedback circuit including a temperature sensor in thermal communication with the polymeric material for sensing a temperature thereof such that the feedback signal varies in accordance with polymeric material temperature.

8. In the thermal actuator system as set forth in claim 1, the improvement further comprising:

the feedback circuit sensing at least one parameter of: integrated power input into the heating element, a dielectric constant of the polymer, resistivity of the polymeric material, translucency of the polymeric material, and pressure of the polymeric material.

9. In the thermal actuator system as set forth in claim 1, the improvement further comprising:

a positive temperature coefficient thermistor electrically connected with the power supply and at least one of the heating element and a heating element current sensor.

10. An electrically controlled thermal actuator system comprising:

an actuator body defining an interior chamber containing a polymeric material which expands when heated;

an extension member connected with the polymeric material to extend relative to the actuator body as the polymeric material is heated;

a heating element disposed in the interior chamber;

a power supply for selectively supplying electrical power to the heating element;

an input circuit for providing a control signal indicative of a selected degree of at least one of extension and force of the extension member relative to the thermal actuator body;

a heater coil current sensor which (1) senses current in the heater coil and (2) provides a feedback signal indicative thereof;

an error circuit for determining a deviation between the control signal and the feedback signal and controlling the power supply in accordance therewith;

a dither circuit for generating an oscillating dither signal, the dither circuit being connected with one of the input circuit, the feedback circuit, and the error circuit for adding the dither signal to one of the control signal and the feedback signal.

11. The system as set forth in claim 10 further including:

a positive temperature coefficient thermistor mounted in thermal communication with the polymeric material and being electrically connected with the power supply.

12. In an electrically controlled thermal actuator system that includes an actuator body defining an interior chamber containing a polymeric material which expands when heated, an extension member connected with the polymeric material to extend relative to the actuator body as the polymeric material is heated, a heating element disposed in the interior chamber, and a power supply for selectively supplying electrical power to the heating element, the improvement comprising:

an input circuit for providing a control signal indicative of a selected degree of at least one of extension and force of the extension member relative to the thermal actuator body;

a feedback circuit sensing parameters which are indicative of at least two of temperature of the polymeric material, pressure of the polymeric material, specific volume and quality of the polymeric material, integrated power input into the heating element, a dielectric constant of the polymeric material, resistivity of the polymeric material, translucency of the polymer, and pressure of the polymeric material and providing feedback signals indicative of the sensed conditions;

an error circuit for determining a deviation between the control signal and the feedback signals and controlling the power supply in accordance therewith.

13. An electrically controlled thermal actuator system comprising:

an actuator body defining an interior chamber containing a polymeric material material which expands when heated;

an extension member connected with the polymeric material to extend relative to the actuator body as the polymeric material material is heated;

a heating element disposed in the interior chamber;

a power supply for selectively supplying electrical power to the heating element;

an input circuit for providing a control signal indicative of a selected degree of at least one of extension and force of the extension member relative to the thermal actuator body;

a feedback circuit (1) sensing two parameters of: integrated power input into the heating element, a dielectric constant of the polymer, resistivity of the polymer, translucency of the polymer, and pressure of the polymeric material material and (2) providing feedback signals indicative of the sensed parameters;

an error circuit for determining a deviation between the control signal and the feedback signals and controlling the power supply in accordance therewith; and a circuit for calculating extension member extension and force from the sensed parameters.

14. A thermal actuator system comprising:

a thermal actuator having:

a body portion that defines an enclosed interior cavity;

a polymeric material which expands when heated and contracts when cooled disposed in the interior cavity;

a heating element disposed in thermal communication with the polymeric material for selectively heating the polymer;

an extension member in communication with the polymer such that the extension member extends relative to the body portion;

an adjustable power supply connected with the heating element for heating the polymeric material for selectively extending the extension member with a selected level of an extension characteristic;

a sensor connected with the thermal actuator for sensing an actuation parameter;

a circuit for calculating extension member extension and force from the sensed actuation parameter.

15. The thermal actuator system as set forth in claim 14 further including:

a positive temperature coefficient device disposed electrically between the power supply and the heating element.

16. The thermal actuator system as set forth in claim 15, wherein the positive temperature coefficient device is mounted in thermal communication with the polymer.

17. The thermal actuator system as set forth in claim 14 further including:

a sensor connected with the thermal actuator for sensing an actuation parameter;

a feedback circuit for providing a feedback signal indicative of the sensed actuator parameter;

an input circuit for providing a reference signal indicative of a selected level of the extension characteristic;

a circuit for determining a deviation between the feedback signal and the reference signal, and adjusting the power supply in accordance with the determined deviation.

18. The thermal actuator system as set forth in claim 17, further including:

the feedback circuit sensing at least one parameter of: integrated power input into the heating element, a dielectric constant of the polymer, resistivity of the polymer, translucency of the polymer, and pressure of the polymeric material.

19. The thermal actuator system as set forth in claim 17, further including:
a dither circuit for adding an oscillating dither signal component to at least one of the reference and feedback signals.

20. The thermal actuator as set forth in claim 14 wherein the extension characteristic is one of extension position, speed, acceleration, and force.

21. The thermal actuator system as set forth in claim 14 further including:
a sensor for sensing temperature of the polymer;
a feedback circuit for providing a feedback signal indicative of the sensed temperature;
an error circuit for determining a deviation between the feedback signal and a reference signal, and adjusting the power supply in accordance with the determined deviation.

22. The thermal actuator system as set forth in claim 14 further including:
a sensor for sensing the actual level of the extension characteristic;
a feedback circuit for providing a feedback signal indicative of the sensed level;
an error circuit for determining a deviation between the feedback signal and a reference signal, and adjusting the power supply in accordance with the determined deviation;
a limit circuit including a sensor for sensing at least one of extensible member position, extension speed, force, and polymer temperature and providing a limit control signal which causes the error circuit to adjust the power supply to reduce power supplied to the heating element.

23. A thermal actuator system comprising:
a thermal actuator having:
a body portion that defines an enclosed interior cavity;
a polymeric material material which expands when heated and contracts when cooled disposed in the interior cavity;
a heating element disposed in thermal communication with the polymer for selectively heating the polymer;
an extension member in communication with the polymer such that the extension member extends relative to the body portion;
an adjustable power supply connected with the heating element for heating the polymer for selectively extending the extension member with a selected level of an extension characteristic;
a sensor connected with the thermal actuator for sensing an actuation parameter;
a feedback circuit sensing at least two parameters of: integrated power input into the heating element, a dielectric constant of the polymer, resistivity of the polymer, translucency of the polymer, and pressure of the polymeric material material;
an input circuit for providing a reference signal indicative of a selected level of the extension characteristic;
a circuit for adjusting the power supply in accordance with the reference signal and the sensed parameters.

24. The system as set forth in claim 23 further including:
a circuit for calculating extension member extension and force from the two sensed parameters.

25. A thermal actuator system comprising:
a thermal actuator having:
a body portion that defines an enclosed interior cavity;
a polymeric material which expands when heated and contracts when cooled disposed in the interior cavity;
a heating element disposed in thermal communication with the polymeric material for selectively heating the polymer;
an extension member in communication with the polymer such that the extension member extends relative to the body portion;
an adjustable power supply connected with the heating element for heating the polymeric material for selectively extending the extension member with a selected level of an extension characteristic;
a sensor connected with the thermal actuator for sensing an actuation parameter;
a feedback circuit for providing a feedback signal indicative of the sensed actuator parameter;
an input circuit for providing a reference signal indicative of a selected level of the extension characteristic;
a circuit for determining a deviation between the feedback signal and the reference signal, and adjusting the power supply in accordance with the determined deviation;
a dither circuit for adding an oscillating dither signal component to at least one of the reference and feedback signals; and
a means for adjusting an amplitude of the dither signal component, the means receiving at least one of the reference and feedback signals to adjust the dither signal component amplitude in accordance with the amplitude thereof.

26. A thermal actuator system comprising:
a thermal actuator having:
a body portion that defines an enclosed interior cavity;
a polymeric material material which expands when heated and contracts when cooled disposed in the interior cavity;
a heating element disposed in thermal communication with the polymer for selectively heating the polymer;
an extension member in communication with the polymer such that the extension member extends relative to the body portion;
an adjustable power supply connected with the heating element for heating the polymer for selectively extending the extension member with a selected level of an extension characteristic;
a sensor for sensing at least one of the extensible member position, extension speed, force, and polymer temperature;
a feedback circuit for providing at least one feedback signal indicative of the condition sensed by the sensor;
a dither circuit for adding an oscillating dither signal component to at least one of the reference and feedback signals;
an error circuit for determining a deviation between the feedback signal and a reference signal, and adjusting the power supply in accordance with the determined deviation;
a limit circuit for receiving the feedback signal and providing a limit control signal which causes the error circuit to adjust the power supply to reduce power supplied to the heating element.

27. A method of controlling a thermal actuator that includes an actuator body defining an interior chamber containing a polymeric material which expands when heated, an extension member connected with the polymeric material to extend relative to the body portion as the polymeric material is heated, and a heating element disposed in the interior chamber, the method comprising:

sensing a condition of the thermal actuator and generating a feedback signal in accordance with the sensed condition;

providing a reference signal indicative of a selected extension characteristic of the extension member;

adding an oscillating dither component to at least one of the control and feedback signals;

varying the dither component in accordance with variations in at least one of the reference and feedback signals;

comparing the reference and feedback signals to produce an error signal indicative of a deviation therebetween;

adjusting an amount of power supplied to the heating element in accordance with the error signal.

28. The method as set forth in claim 27 wherein the sensed condition includes at least one of extension position, speed, and force of the extension member.

29. The method as set forth in claim 27 wherein the sensed condition includes at least one of extension member position, extension member speed, extension member force, polymeric material temperature, and polymeric material pressure.

30. A method of controlling a thermal actuator that includes an actuator body defining an interior chamber containing a polymeric material which expands when heated, an extension member connected with the polymeric material to extend relative to the body portion as the polymeric material is heated, and a heating element disposed in the interior chamber, the method comprising:

sensing at least two parameters of: integrated power input into the heating element, a dielectric constant of the polymeric material resistivity of the polymeric material translucency of the polymer, and pressure of the polymeric material and generating a feedback signal in accordance therewith;

providing a control signal indicative to a selected extension characteristic of the extension member;

comparing the control and feedback signals to produce an error signal indicative of a deviation therebetween;

adjusting an amount of power supplied to the heating element in accordance with the error signal; and calculating extension member extension and force from the two sensed parameters.

31. The method as set forth in claim 30 further including:

adding an oscillating dither component to at least one of the control and feedback signals. a

* * * * *